United States Patent
Huang et al.

(10) Patent No.: US 8,468,472 B1
(45) Date of Patent: Jun. 18, 2013

(54) COMPUTING DEVICE AND METHOD OF CHECKING WIRING DIAGRAMS

(75) Inventors: Ya-Ling Huang, Shenzhen (CN); Chia-Nan Pai, New Taipei (TW); Shou-Kuo Hsu, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/456,241

(22) Filed: Apr. 26, 2012

(51) Int. Cl.
*G06F 50/17* (2006.01)

(52) U.S. Cl.
USPC .................................. 716/55; 55/126; 55/137

(58) Field of Classification Search
USPC .......................................... 716/55, 126, 137
See application file for complete search history.

(56) References Cited

U.S. PATENT DOCUMENTS 7,114,132 B2 * 9/2006 Yaguchi ........................ 716/115

* cited by examiner

*Primary Examiner* — Thuan Do
(74) *Attorney, Agent, or Firm* — Altis Law Group, Inc.

(57) ABSTRACT

In a computing device, computerized method, and a non-transitory storage medium, plug-in capacitors are selected from capacitors in a wiring diagram according pin information of the capacitors. A straight line is constructed for each of the plug-in capacitors according to size of holes where pins of the plug-in capacitor are to be inserted into. Paths of all transmission lines in the wiring diagram are obtained, and a determination of, whether any of the paths has at least one intersection point with at least one constructed straight line, is made. One or more paths, which have at least one intersection point with at least one constructed straight line, are recorded into a path list. The path list is then outputted using the computing device.

15 Claims, 5 Drawing Sheets

COMPUTING DEVICE AND METHOD OF CHECKING WIRING DIAGRAMS

BACKGROUND

1. Technical Field

Embodiments of the present disclosure relate to wiring design, and more particularly to a computing device and a method of checking wiring diagrams.

2. Description of Related Art

During the charging and discharging of a capacitor, current flowing through pins of the capacitor is heavy, and may interfere with signals in nearby transmission lines, particularly if any transmission lines pass between the pins of the capacitor, therefore it will be desirable to ensure that no transmission line passes between the pins when designing the layout of a printed circuit board (PCB).

Existing PCB design software does not alert the designer of any transmission lines pass between pins of a capacitor in the wiring diagram of a PCB design. Thus, the designer must check for this by himself. It may be easy enough for the designer to check if there is a transmission line passing between pins of a surface mounted capacitor, but it is difficult for the designer to check if there is a transmission line passing between pins of a plug-in capacitor.

DETAILED DESCRIPTION

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
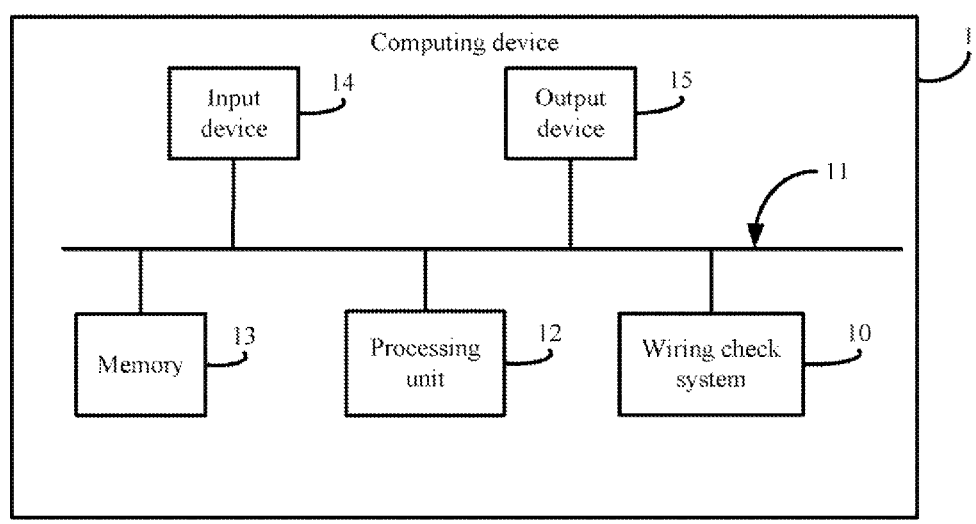
FIG. 1 is a block diagram of one embodiment of a computing device including a wiring check system.

FIG. 1 is a block diagram of one embodiment of a computing device 1 including a wiring check system 10. The computing device 1 may be a computer, a server, or a personal digital assistant (PDA), for example. The computing device 1 may further include components such as a bus 11, a processing unit 12, a memory 13, an input device 14, and an output device 15. One skilled in the art would recognize that the computing device 1 may be configured in a number of other ways and may include other or different components.

Figure 2:
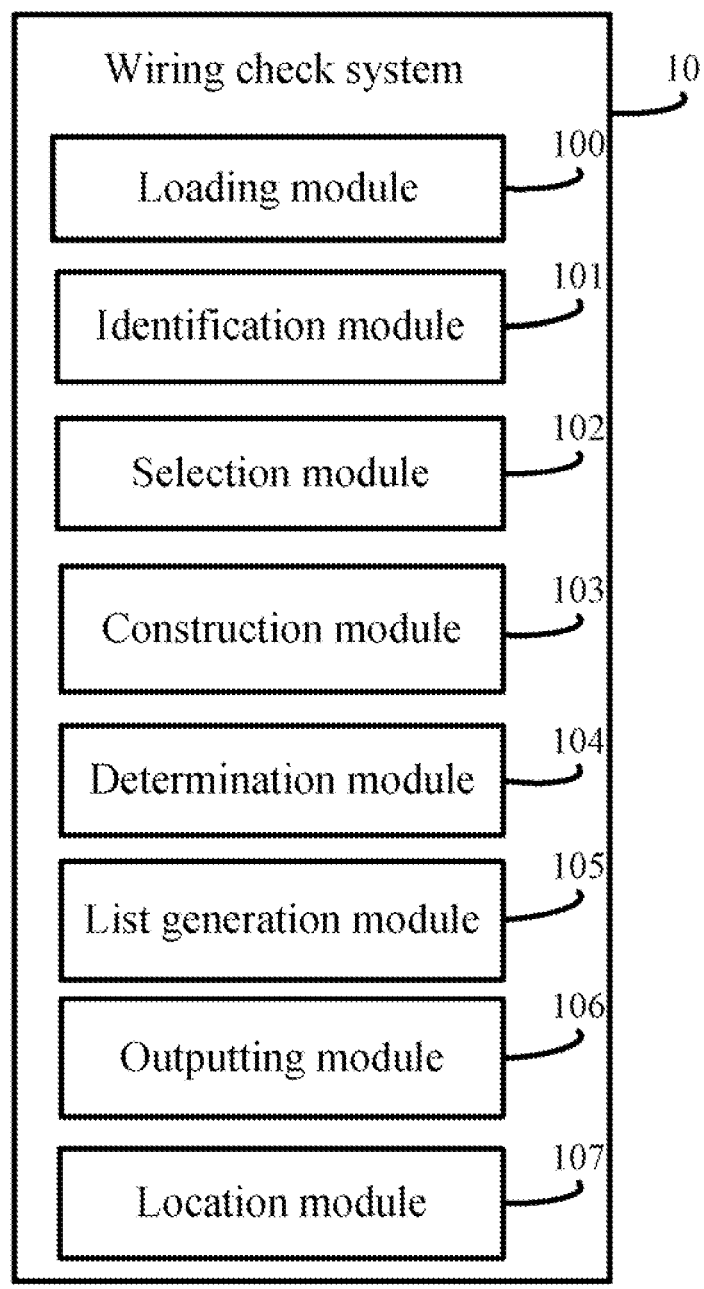
FIG. 2 is a block diagram of one embodiment of function modules of the wiring check system in FIG. 1.

The wiring check system 10 includes a number of function modules (depicted in FIG. 2). The function modules may include computerized code in the form of one or more programs, which have functions of automatically checking if there is a transmission line passing between pins of a plug-in capacitor in a wiring diagram of a printed circuit board (PCB).

The bus 11 permits communication among the components, such as the wiring check system 10, the processing unit 12, the memory 13, the input device 14, and the output device 15.

The processing unit 12 may include a processor, a microprocessor, an application-specific integrated circuit (ASIC), and a field programmable gate array, (FPGA) for example. The processing unit 12 may execute the computerized code of the function modules of the wiring check system 10 to realize the functions of the wiring check system 10.

The memory 13 may include some type(s) of computer-readable storage medium, such as a hard disk drive, a compact disc, a digital video disc, or a tape drive. The memory 13 stores the computerized code of the function modules of the wiring check system 10 for execution by the processing unit 12.

The memory 13 also stores one or more wiring diagrams of PCBs. As known, a wiring diagram is an electronic file of a simplified conventional pictorial representation of an electrical circuit, in which multiple electrical components are wired together using transmission lines. The memory 13 further stores basic information of each of the electrical components, such as resistors, capacitors, and so on, in each of the wiring diagrams. In one embodiment, the basic information includes, but is not limited to, types, names, and pin information of the electrical components, line lengths, line widths, line spaces, and paths of the transmission lines, and so on. Types of the electrical components may include resistors and capacitors, for example. Names of the electrical components may be the first resistor, the first capacitor, and the second capacitor, for example. Pin information of an electrical component includes coordinates of each pin of the electrical component, types and sizes of holes where the pins are to be inserted into, and so on.

The input device 14 may include a mechanism that permits a user to input data to the computing device 1, such as a keyboard, a keypad, a mouse, a pen, voice recognition and/or biometric mechanisms, for example. The output device 15 may include one or more output mechanisms, including a display, a printer, and one or more speakers, for example.

FIG. 2 is a block diagram of one embodiment of the function modules of the wiring check system 10. In one embodiment, the wiring check system 10 may include a loading module 100, an identification module 101, a selection module 102, a construction module 103, a determination module 104, a list generation module 105, an outputting module 106, and a location module 107. The function modules 100-107 provide at least the functions needed to execute the steps illustrated in FIGS. 3A and 3B.

Figure 3A:
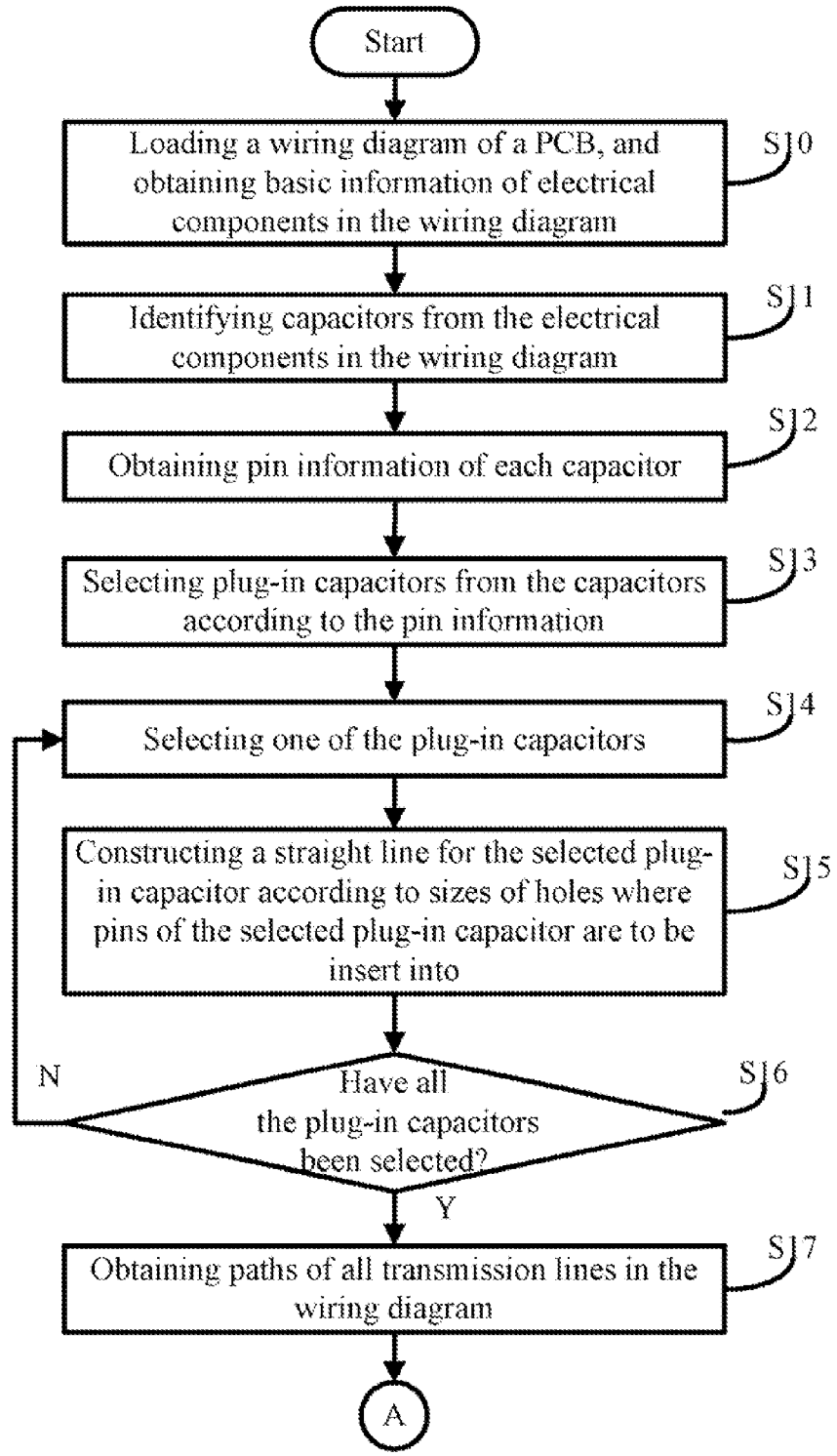
FIGS. 3A and 3B illustrate a flowchart of one embodiment of a method for checking wiring diagrams.
Figure 3B:
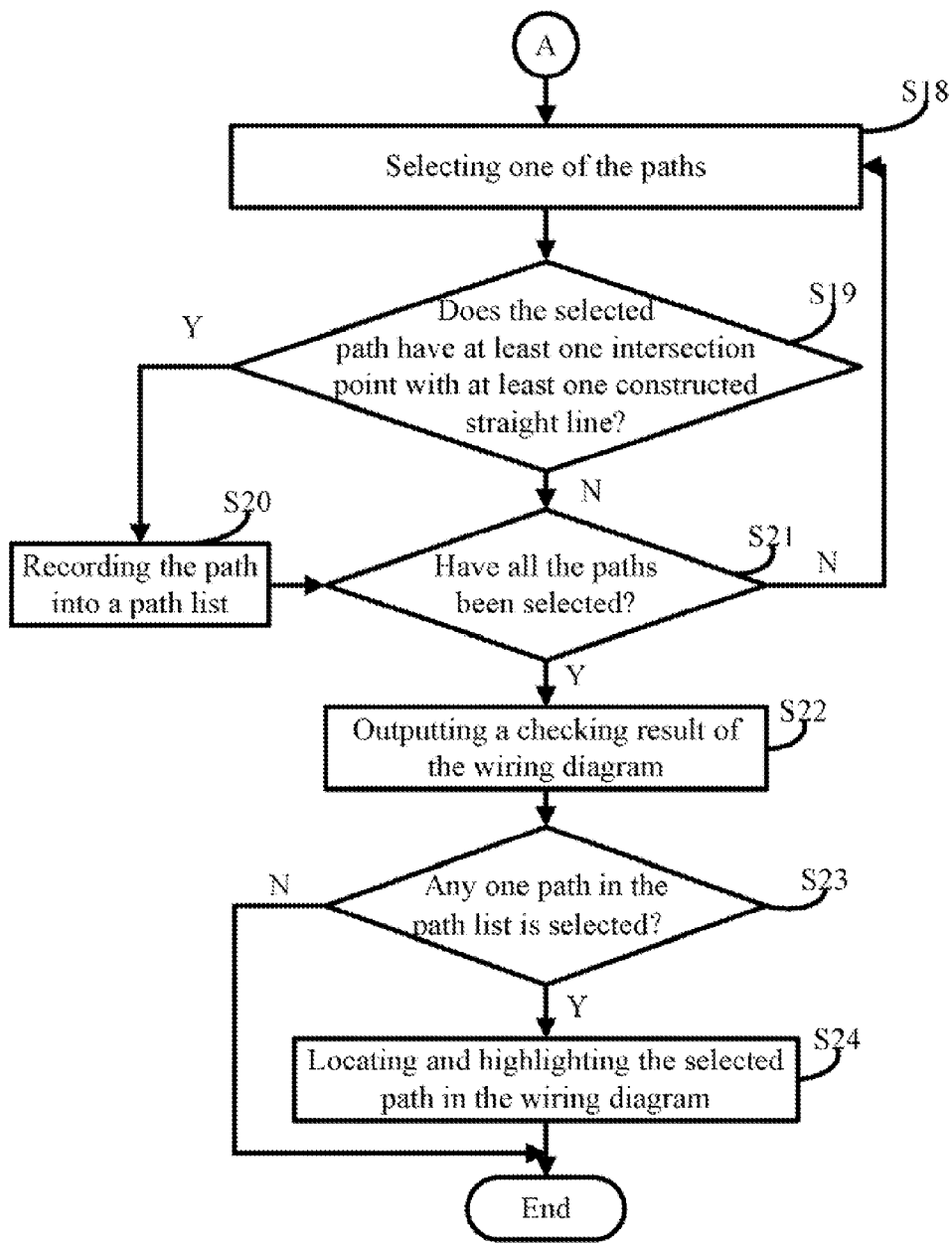

FIGS. 3A and 3B illustrate a flowchart of one embodiment of a method for checking wiring diagrams. Depending on the embodiment, additional steps may be added, others removed, and the ordering of the steps may be changed.

In step S10, the loading module 100 loads a wiring diagram from the memory 13 of the computing device 1, and obtains basic information of electrical components in the wiring diagram.

In step S11, the identification module 101 identifies capacitors in the wiring diagram according to the basic information. As mentioned above, the basic information includes types of the electrical components.

In step S12, the selection module 102 obtains pin information of each of the capacitors from the basic information. As mentioned above, the pin information includes types and sizes of holes where the pins are to be inserted into.

In step S13, the selection module 102 selects plug-in capacitors from the capacitors according to the pin information. In one embodiment, if the type of holes, where pins of a capacitor are to be inserted into, is a through hole, the capacitor is a plug-in capacitor.

In step S14, the construction module 103 selects one plug-in capacitor. The selection of the plug-in capacitor may be done according to any user-determined order.

Figure 4:
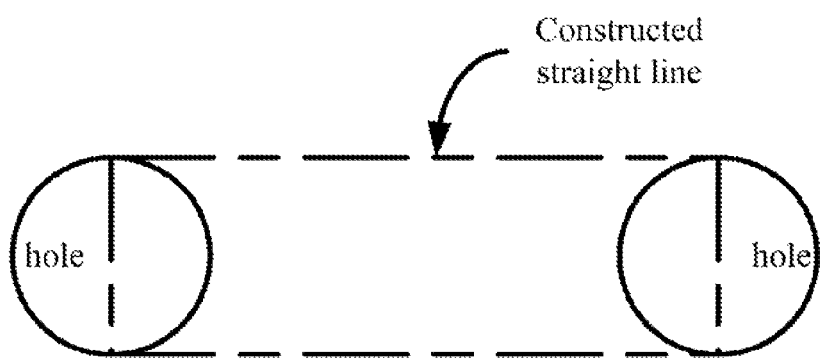
FIG. 4 is a schematic diagram of a constructed straight line.

In step S15, the construction module 103 constructs a straight line according to the size of the holes where pins of the selected plug-in capacitor are to be inserted into. In one embodiment, the holes are circular. The width of the constructed straight line may equal a diameter of the hole, and the length of the constructed straight line may equal a distance between the two pins of the selected plug-in capacitor. A schematic diagram of the constructed straight line is shown in FIG. 4.

In step S16, the construction module 103 determines whether all the plug-in capacitors have been selected. Steps S14 and S15 are repeated until all plug-in capacitors have been selected, then step S17 is implemented.

In step S17, the determination module 104 obtains paths of all transmission lines in the wiring diagram from the basic information of the wiring diagram.

In step S18 (FIG. 3B), the determination module 104 selects one path. The selection of the path may be random.

In step S19, the determination module 104 determines whether the selected path has at least one intersection point with at least one constructed straight line. Step S20 is implemented when the selected path has at least one intersection point with at least one constructed straight line, and step S21 is implemented when the selected path has no intersection point with any constructed straight line.

In step S20, the list generation module 105 records the selected path in a path list. Step S21 is implemented after step S20.

In step S21, the determination module 104 determines that whether all the paths have been selected. Steps S18 to S20 are repeated until all paths have been selected, then, step S22 is implemented.

In step S22, the outputting module 106 outputs a wiring diagram checking result using the output device 15. The checking result includes the path list. From the path list, the user can know which transmission lines pass between pins of the plug-in capacitors.

In step S23, the location module 107 determines if any path in the path list has been selected. When a user selects a path in the path list using the input device 14, such as the user clicks a path in the path list using a mouse, the location module 107 determines that the path has been selected, and then step S24 is implemented. Otherwise, the flow ends when no path in the path list has been selected.

In step S24, the location module 107 locates the selected path in the wiring diagram, and highlights the selected path. In one embodiment, the selected path may be highlighted by colorizing or bolding the selected path.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized method for checking wiring diagrams, the method being executed by at least one processor of a computing device and comprising:
    selecting plug-in capacitors in a wiring diagram of a printed circuit board (PCB) according to pin information of each of the capacitors;
    constructing a straight line for each of the plug-in capacitors, wherein a width of the constructed straight line equals a diameter of holes where pins of the plug-in capacitors are to be inserted into;
    obtaining paths of all transmission lines in the wiring diagram;
    determining whether any of the paths intersects with at least one constructed straight line;
    recording one or more paths, which intersects with at least one constructed straight line, into a path list; and
    outputting the path list using an output device.

2. The method according to claim 1, wherein the pin information comprises coordinates of pins of the electrical components, types and sizes of holes where the pins are to be inserted into.

3. The method according to claim 2, wherein the plug-in capacitors are selected according to the types of the holes where pins of the capacitors are to be inserted into.

4. The method according to claim 1, wherein width of the constructed straight line equals a diameter of a hole and length of the constructed straight line equals a distance between the pins of the plug-in capacitor.

5. The method according to claim 1, further comprising:
    determining if any path in the path list has been selected; and
    locating and highlighting selected path in the wiring diagram.

6. An electronic device, comprising:
    an input/output device;
    a non-transitory storage medium;
    at least one processor; and
    one or more modules that are stored in the non-transitory storage medium; and are executed by the at least one processor, the one or more modules comprising instructions to:
    select plug-in capacitors in a wiring diagram of a printed circuit board (PCB) according to pin information of each of the capacitors;
    construct a straight line for each of the plug-in capacitors, wherein a width of the constructed straight line equals a diameter of holes where pins of the plug-in capacitor are to be inserted into;
    obtain paths of all transmission lines in the wiring diagram;
    determine whether any of the paths intersects with at least one constructed straight line;
    record one or more paths, which intersects with at least one constructed straight line, into a path list; and
    output the path list using an output device of the computing device.

7. The electronic device according to claim 6, wherein the pin information comprises coordinates of pins of the electrical components, types and sizes of holes where the pins are to be inserted into.

8. The electronic device according to claim 7, wherein the plug-in capacitors are selected according to the types of the holes where pins of capacitor are to be inserted into.

9. The electronic device according to claim 6, wherein width of the constructed straight line equals a diameter of the holes and length of the constructed straight line equals a distance between the pins of the plug-in capacitor.

10. The electronic device according to claim 6, wherein the one or more modules further comprising instructions to:
 determine if any path in the path list has been selected; and
 locate and highlight selected path in the wiring diagram.

11. A non-transitory storage medium having stored thereon instructions that, when executed by a processor of a computing device, causes the processor to perform a method for checking wiring diagrams, comprising:
 selecting plug-in capacitors from capacitors in a wiring diagram of a printed circuit board (PCB) according to pin information of each of the capacitors;
 constructing a straight line for each of the plug-in capacitors, wherein a width of the constructed straight line equals a diameter of holes where pins of the plug-in capacitor are to be inserted into;
 obtaining paths of all transmission lines in the wiring diagram;
 determining whether any of the paths intersects with at least one constructed straight line;
 recording one or more paths, which intersects with at least one constructed straight line, into a path list; and
 outputting the path list using an output device of the computing device.

12. The non-transitory storage medium according to claim 11, wherein the pin information comprises coordinates of pins of the electrical components, types and sizes of holes where the pins are to be inserted into.

13. The non-transitory storage medium according to claim 12, wherein the plug-in capacitors are selected according to the types of the holes where pins of capacitor are to be inserted into.

14. The non-transitory storage medium according to claim 11, wherein width of the constructed straight line equals a diameter of the holes and length of the constructed straight line equals a distance between the pins of the plug-in capacitor.

15. The non-transitory storage medium according to claim 11, wherein the method further comprises:
 determining if any path in the path list has been selected; and
 locating and highlighting selected path in the wiring diagram.

* * * * *